United States Patent [19]
Young

[11] Patent Number: 5,499,011
[45] Date of Patent: Mar. 12, 1996

[54] BRAKE PROPORTIONING DISPLAY THIRD BRAKELIGHT

[76] Inventor: Hsien-Fong Young, No. 1, 9 Lin, Lu-Min-Li, Hsin-Pu, Hsin-Chu, Taiwan, 305

[21] Appl. No.: 306,587

[22] Filed: Sep. 15, 1994

[51] Int. Cl.⁶ .................................................. B60Q 1/44
[52] U.S. Cl. .............................. 340/479; 200/61.45 R; 200/61.52; 340/467
[58] Field of Search ................................. 340/479, 467, 340/463, 464; 200/61.45 R, 61.52

[56] References Cited

U.S. PATENT DOCUMENTS

| | | | |
|---|---|---|---|
| 4,170,723 | 10/1979 | Arsoy | 340/479 |
| 4,667,177 | 5/1987 | Athalye | 340/479 |
| 4,889,068 | 12/1989 | Tabata et al. | 200/61.53 |
| 4,983,952 | 1/1991 | Athalye | 340/467 |
| 5,089,805 | 2/1992 | Salsman | 340/467 |
| 5,309,141 | 5/1994 | Mason et al. | 340/467 |

Primary Examiner—Brent A. Swarthout
Attorney, Agent, or Firm—Pro-Techtor International

[57] ABSTRACT

A third brakelight is to apply the brake inertial mechanism to the production of brake proportioning effect by triggering the power source of lamp sets. This brakelight comprises a brake proportioning component and light emitted diodes or filament type bulb lamp sets. During a braking of the vehicle, a set of different length pendula may impact the printed circuit board having open circuits which are combined with pendula, served as switches. The stronger braking, the larger angle pendulum will swing while the vehicle is in motion. Thus, the more pendula impact the open circuits, the more lamps are ignited. And the driving safety of the vehicle can be promoted.

3 Claims, 6 Drawing Sheets

BRAKE PROPORTIONING DISPLAY THIRD BRAKELIGHT

BACKGROUND OF THE INVENTION

There are some brake proportioning third brakelights or brake warning systems appearing in the current market. The sensing components of these kinds of devices mostly use mercury switch or movable magnet for triggering the light power in order to achieve the purpose of brake proportioning or warning during a braking of the vehicle. Both of the sensing components have some disadvantages. For instance, that of mercury switch, is to use the movement of liquid metal for energizing the electric power of light. Since energizing the light power by mercury component is not restricted to the vehicle moving direction, it can also cause the brake proportioning effect due to the shaking of transverse direction while the vehicle driving on the rugged road. Meanwhile in the day of increased environmental protection, the mercury component is located inside the case of device, it increases the difficulties of disposal when no more use remains.

In the case of movable magnet used for sensing component, it still has the problems of sensing reliability since the strength of magnet, and the closing ability of reed switch provided by makers are hard to reach the unified sensing standard. These two sensing elements produce two uncertain factors. It causes the adjustment difficulties when in production. Meanwhile, it can only use nonferrous materials within the range of magnetic field while applying magnet as sensor. It must avoid using the widely used ferrous materials. I personally proposed the device named "magnetic pendulum brake classification third brakelamp" which obtained the patent of Taiwan, R.O.C. pat. No. 75207. (published on the 21st of Sep. 1991, the official gazette of the National Bureau of Standards, Taiwan.) This device employs a magnetic pendulum as sensing component. Since magnetic pendulum may pass over a set of reed switches as pendulum swings, the gates of silicon controlled rectifers (SCRs)connected to reed switches may be triggered. A set of lamps connected to SCRs may be ignited due to the gates of SCRs being triggered. Thus, the stronger braking occurs, the more lamps will be ignited. Up to now, it is still a kind of simple and efficient brake proportioning third brakelight.

Unfortunately this third brakelight still has some other problems in addition to the above described disadvantages, including 1. the space between the reed switches fixed, which limits the adjustable function.
2. having some mass production difficultis since using glass sealing reed switch.
3. installment flexiblity not considered since the brake proportioning component needs to maintain horizontally.

The present invention is directed at the elimination of all the above mentioned problems in addition to promotion of the brake proportioning function.

BRIEF SUMMARY OF THE INVENTION

A third brakelight is to apply the brake inertial mechanism to the production of brake proportioning effect by triggering the power source of lamp sets. This brakelight comprises a brake proportioning component and light emitted diodes or filament type bulb lamp sets.

During a brake of the vehicle, a set of different length pendula a may impact the printed circuit board having open circuits which are combined with pendula, served as switches. The open circuits via a controlled circuit which comprises silicon controlled rectifers and resisters are connected to lamp sets. The stronger braking, the larger angle pendulum will swing. Thus, the more pendula a impact the open circuits, the more lamps are ignited due to the gate of silicon controlled rectifer (SCR) being triggered.

The electric power lock of the lamp sets except the 1st grade lamp set, is just to employ the feature of SCR which maintains electric current once being triggered. The brake proportioning display on the brakelight is thus in real response on the state of a braking of the vehicle. And the driving salty of the vehicle can be promoted.

Meanwhile in this device, there will have two combinations between lamp sets and brake proportioning component for convenience of user's installation.

BRIEF DESCRIPTION OF THE DRAWINGS

The present invention, both as to its organization and manner of operation, together with further objects and advantages thereof, may best be understood with reference to the following description, taken in connection with the accompanying drawings in which.

DETAILED DESCRIPTION OF THE ILLUSTRATIVE EMBODIMENT

A. The organization of the present invention

Figure 1:
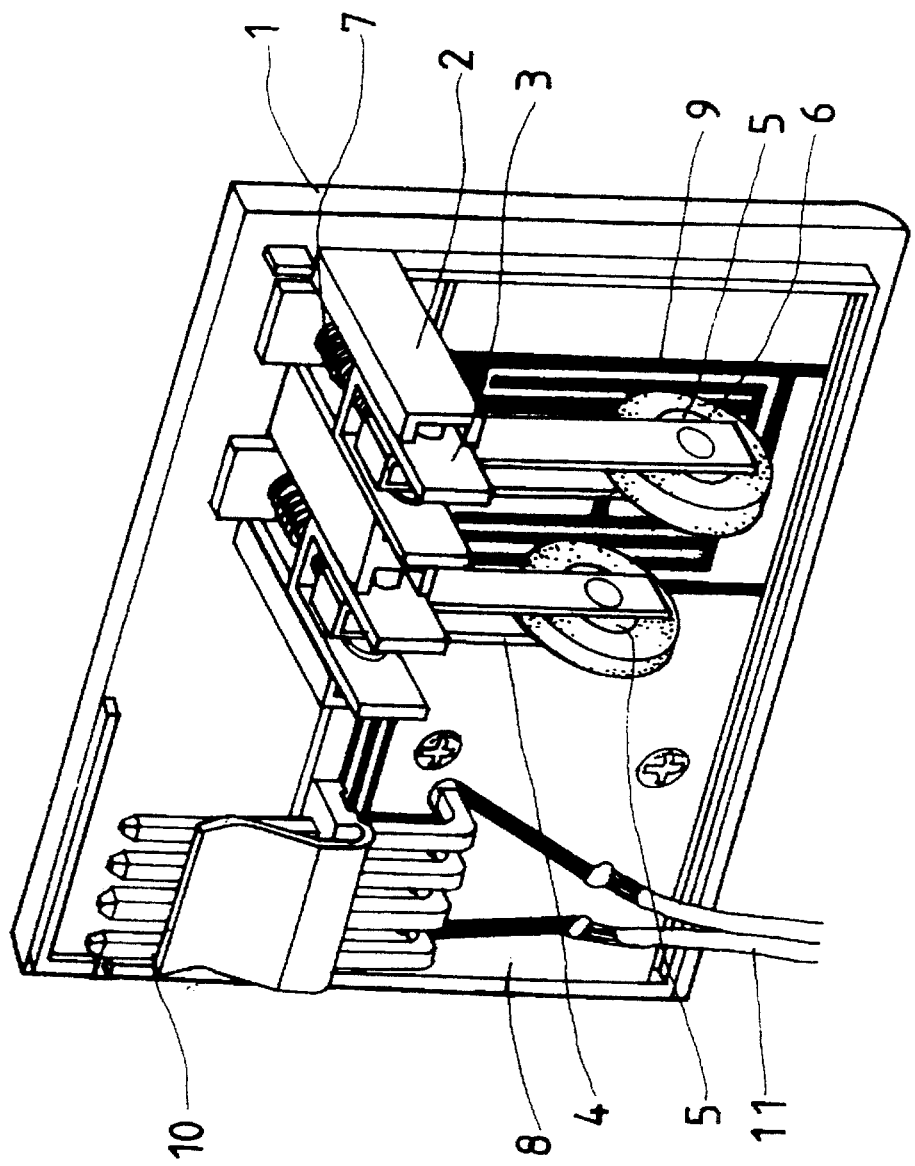
FIG. 1 is a perspective view of brake proportioning component showing mechanical organization of pendula with related parts.
Figure 2:
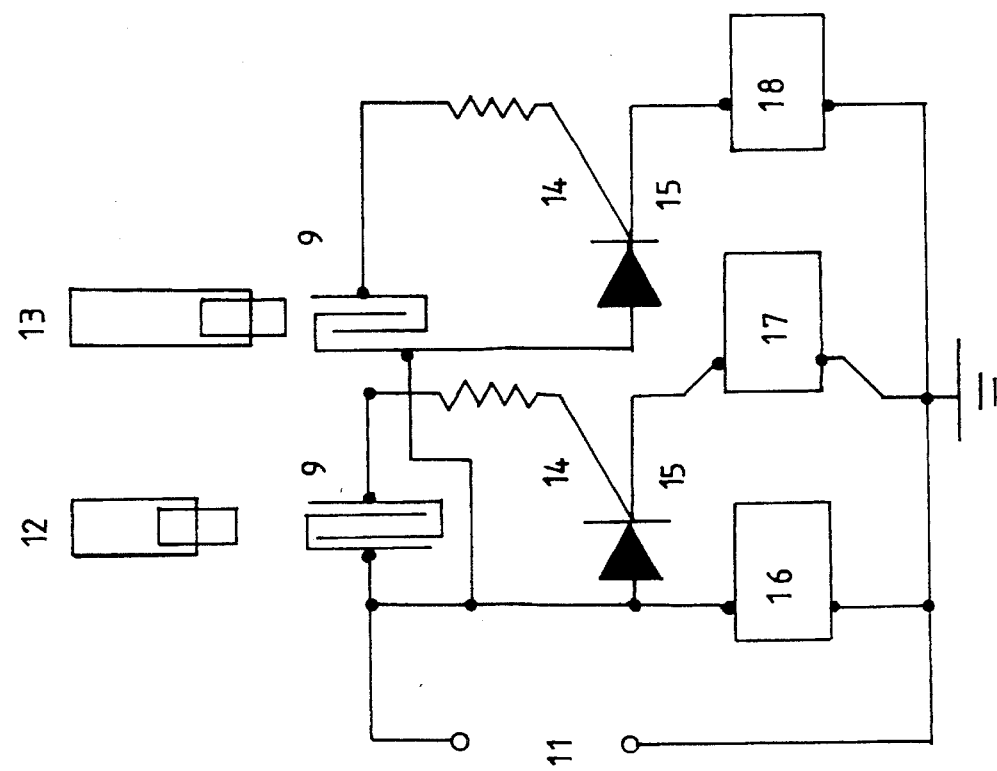
FIG. 2 is a schematic view of an electronic circuit of 3-grade type brake proportioning third brakelight.

"Brake proportioning display third brakelight" comprises a brake proportioning component and light emitted diodes (LED) or filament type bulb lamp sets. Referring to FIG. 1 and FIG. 2, the brake proportioning component is composed of a set of different length pendula 12 and 13, a plurality of silicon controlled rectifers(SCR) 15 and a plurality of resisters 14. A pendulum including an iron cylindrical body 5 housed with a conductive rubber ring 6, has pendulum arm 4 supported by a movable frame 3. The movable frame 3 is able to slide on the rail of suspending beam 2 which is fixed on the brake proportioning component main frame 1. A screw with a coil spring 7 mounted between the movable frame 3 and the brake proportioning component main frame 1 is used for adjusting the supporting point of pendulum.

Each of the pendula a has the same structure except pendulum arm length. Meanwhile the motion of each pendulum is independent, it will not interact with the others. Such design is particularly of benifit to adjustment of each grade reference.

A printed circuit board(PCB) 8 is mounted on the brake proportioning component main frame 1. The place on the PCB, relative to the position which pendulum may impact when pendulum in motion, has comb type open circuits 9 which are in combination with pendulum 12 and pendulum 13, served as switches. The comb type open-circuits via connector 10 are connected to the controlled circuits comprising SCRs 15 and resisters 14. The main purpose of housing iron made cylindrical body 5 with conductive rubber ring 6 is to increase the conductivity and decrease the impact noise.

B. Electronic Circuit

Referring again to FIG. 2, one end of comb type open circuit 9 is linked to the positive pole of power source 11, the other end of open circuit 9 is connected to the gate of SCR 15 via resister 14. The anode of SCR 15 is connected to the positive pole of power source 11, the cathode of SCR 15 is connected to the second lamp set 17( or the third grade lamp set 18). If the gate of SCR 15 is triggered by the pendulum 12 ( or 13), the lamp set linked with SCR 15 will be ignited.

The first grade lamp set which electric circuit is independent to that of brake proportioning component, will be ignited once a braking of the vehicle occurs. The electronic circuit organization of the other grades is the same. In fact, the similar electonic circuits may extend as many grades as we wish, not restricted to that of showing on FIG. 2.

C. Operation theory

This third brakelight is to apply the brake inertial mechanism to the ignition of lamp sets by pendula impacting open circuits on PCB. This manner of energizing electric circuits is just like that when human fingers hit the keypad of the calculator. The angle between impacting pendulum and PCB is different for different pendulum. The long pendulum needs smaller swinging angle than that of the short pendulum when impacting PCB. The stronger braking, the larger angle pendulum will swing. Therefore, the more pendula impact the open circuits on PCB, the more lamps are ignited due to the gates of SCRs being triggered since SCRs are connected to lamp sets. The brake proportioning effect is thus achieved.

For the purpose of increasing the flexibility of respective grade adjustment, the supporting point of pendulum is designed to be adjustable. In fact, changing the supporting point of pendulum in this design is just like that of changing the angle between impacting pendulum and PCB.

Figure 5:
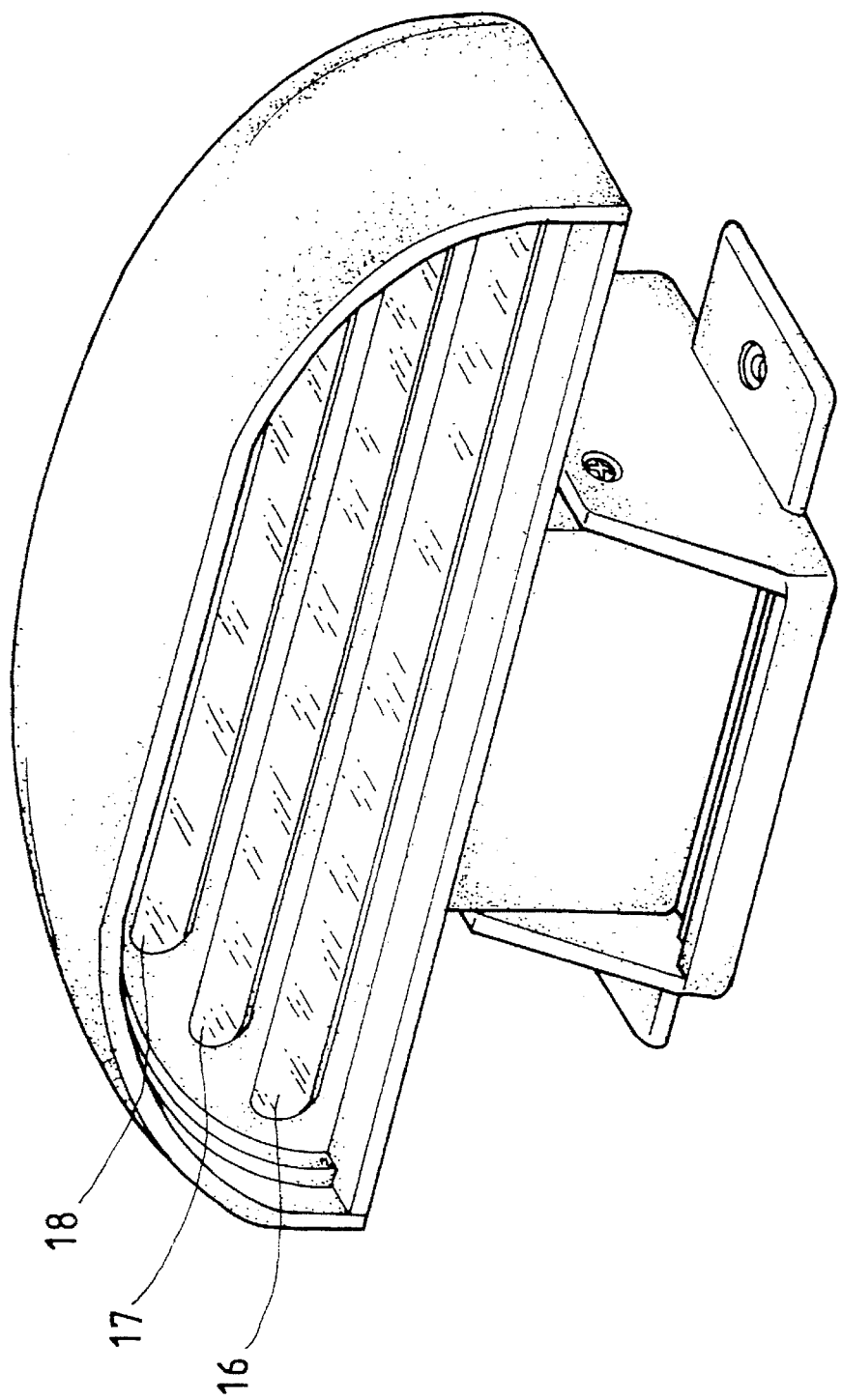
FIG. 5 is an outlook view of brake proportioning component combined with LED lamp sets unified to one body.
Figure 6:
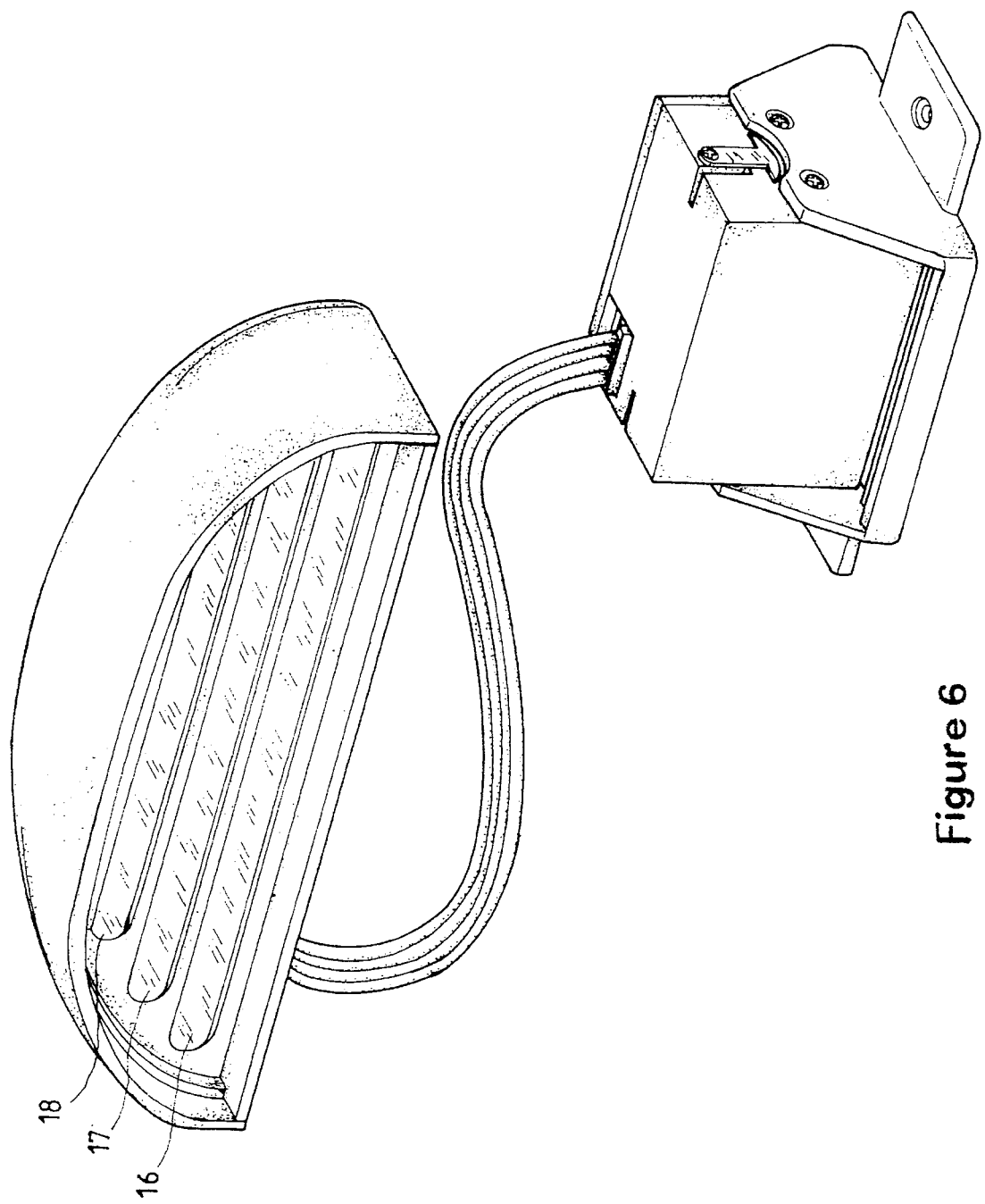
FIG. 6 is an outlook view of brake proportioning component independent from LED lamp sets.

D. Installment and the brake proportioning component case assembly Referring to FIG. 5, the brake proportioning component can be in combination with lamp sets unified to one body. Referring to FIG. 6, the brake proportioning component can also be mounted at the part of the vehicle, separated from lamp sets. The brake proportioning component should be fixed on the vehicle horizontally in addition to the swing direction of pendulua keeping parallel to the moving direction of the vehicle. Meanwhile the PCB side of the brake proportioning component should face the front of the vehicle.

Figure 3:
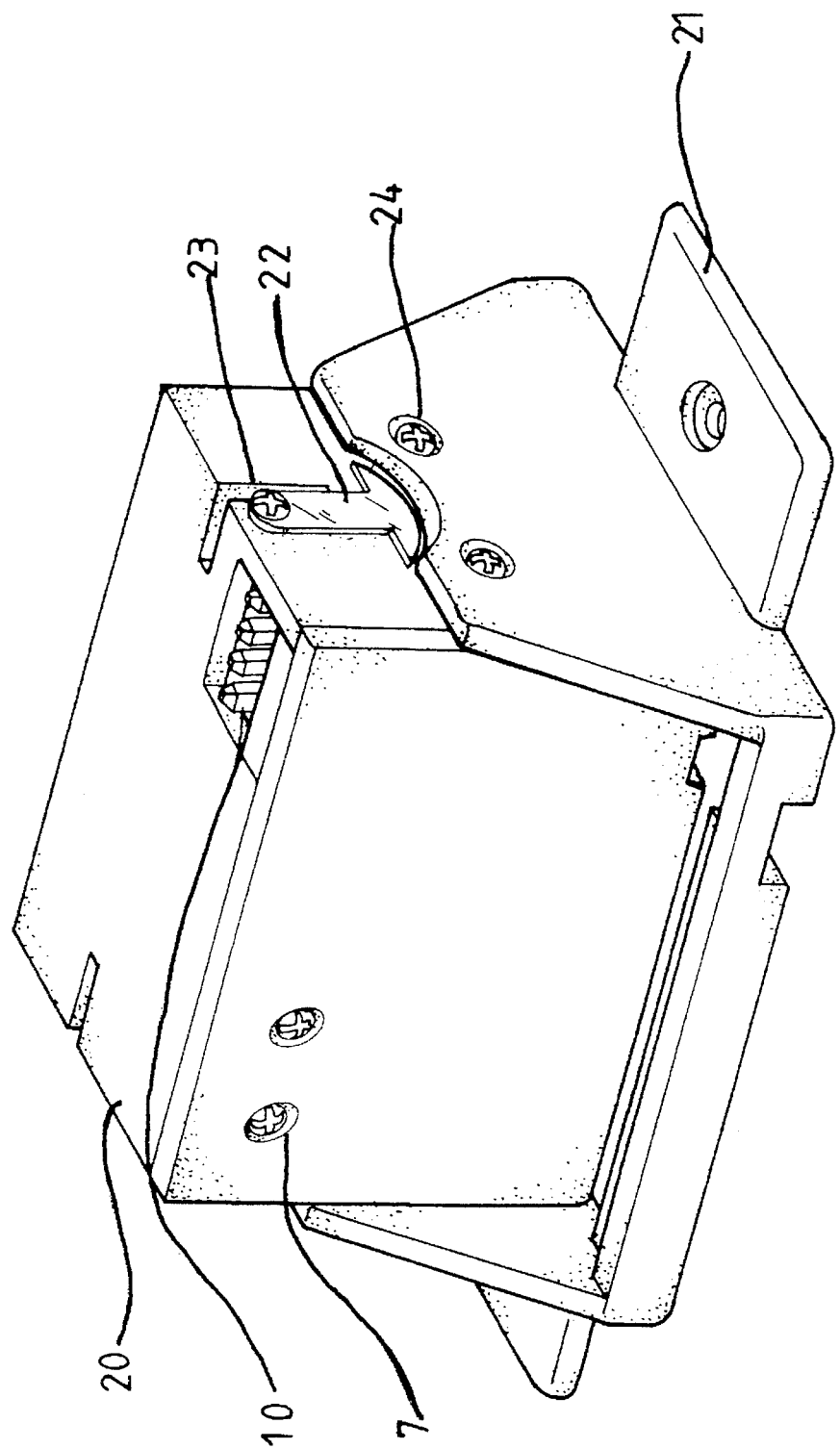
FIG. 3 is a perspective view of the horizontal combination of brake proportioning component supporting box and holding frame.
Figure 4:
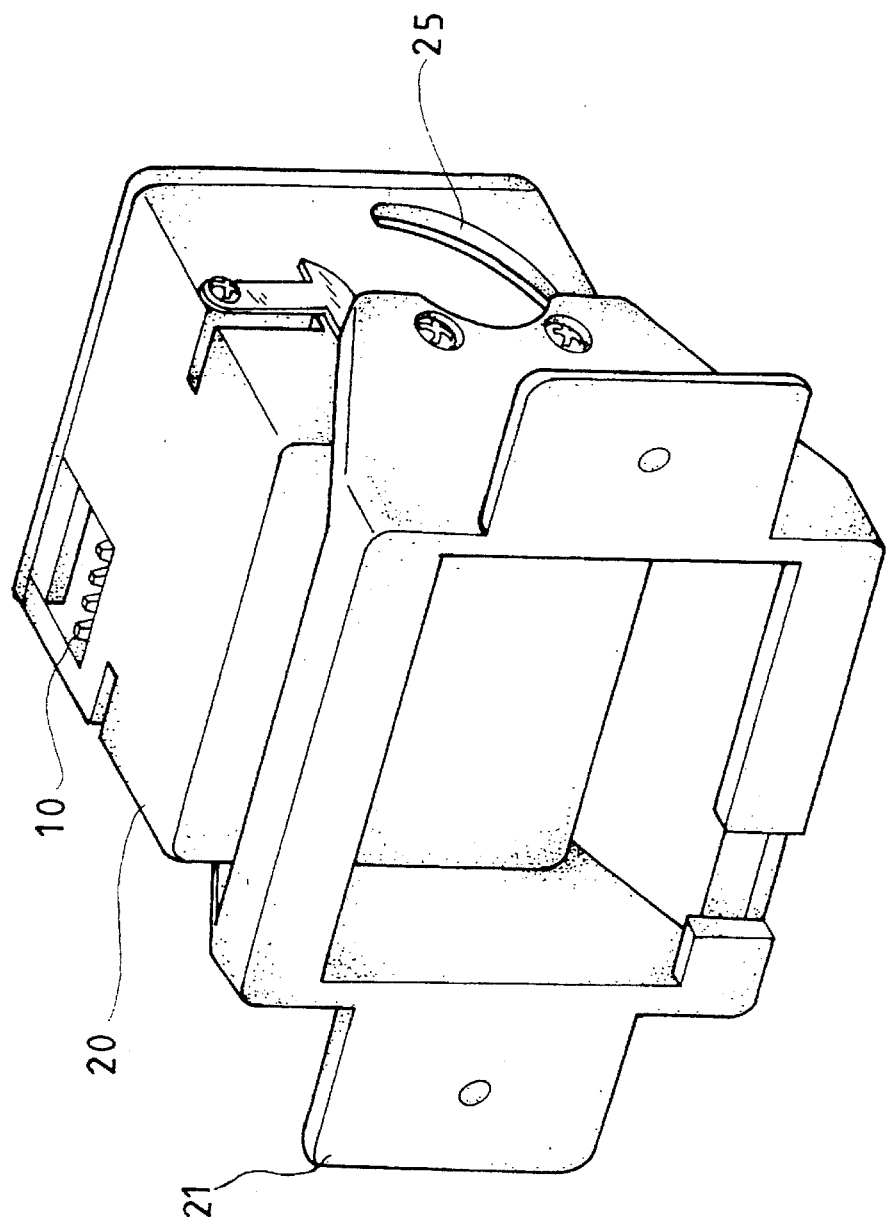
FIG. 4 is a perspective view of the perpendicular combination of brake proportioning component supporting box and holding frame.

Referring to FIG. 3 and FIG. 4, the brake proportioning component includes supporting box 20 and holding frame 21.

The upper part of supporting box 20 has a loosely rotating anchor type plate 22 which is served as a horizontal indicator. The parallel reference line 23 is coupled with the use of this horizontal indicator. Both sides of supporting box 20 have screw holes used for fixing screws 24 with holding frame 21, and over 90 degrees camber type screw holes 25 used for fixing screws with some needed combination angle between supporting box 20 and holding frame 21, to let brake proportioning component maintain in the horizontal position.

E. Other description

The electric circuit of the first grade lamp set of this invention is independent from that of brake proportioning component, that is, the first lamp set will be ignited once braking occurs.

The other grade lamp sets are ignited according to the states of pendula impacting PCB. The electric power lock of the lamp sets except the 1st grade lamp set, is to employ the feature of SCR which maintains electric current once being triggered. The brake proportioning effect appears only in the occasion of a braking of the vehicle. This kind of brake control design is very different from the other complicated electronic brake monitoring systems which monitor the driving states from the vehicle moving. This simple and effective design can greatly reduce the possibilities of electronic troubles in addition to low power comsumption.

I claim:

1. A brakelight for a vehicle comprising:

a plurality of lighting elements;

a brake proportioning component including a plurality of pendula and a like number of silicon controlled rectifiers and resistors, said pendula each include a cylindrical body encircled by a conductive rubber ring, an arm of each of said pendula is supported by a movable frame which slides on a rail of a suspending beam fixed on a brake proportioning component main frame;

each said arm of said pendula differs in length from each of the other arms of said pendula, each said pendula being otherwise identical in construction;

a screw with a coil spring is mounted between said movable frame and said brake proportioning component main frame to enable a user to adjust a supporting point of each said pendula;

a controlling circuit on a printed circuit board including a plurality of comb type open circuits, said comb type circuits being equal in number to the number of pendula, said comb type open circuits are connected to said silicon controlled rectifiers and said resistors; wherein when a braking force is applied to said vehicle, at least one of said pendula swings so that said conductive rubber ring contacts said comb type open circuit, thereby causing said controlling circuit to activate at least one of said lighting elements, the number of pendula that swing and therefore the number of lighting elements activated is proportional to the magnitude of said braking force.

2. The brakelight of claim 1 wherein:

said silicon controlled rectifiers include electric power locks so that once said controlling circuit has activated said lighting element, said lighting element remains activated even when said conductive rubber ring is no longer in contact with said comb type open circuit.

3. The brakelight of claim 1 wherein:

a case portion of said brake proportioning component includes a supporting box and a holding frame, an upper part of said supporting box includes an anchor plate;

said anchor plate includes rotating means such that said brake proportioning component is maintained in a horizontal position regardless of an angle of installation of said anchor plate.

\* \* \* \* \*